United States Patent
Grohn

(10) Patent No.: US 6,754,198 B1
(45) Date of Patent: Jun. 22, 2004

(54) METHOD TO ENABLE TO PEER DEVICE COMMUNICATION OVER BI-DIRECTIONAL SERIAL BUS

(75) Inventor: Ossi Ilari Grohn, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 813 days.

(21) Appl. No.: 09/696,994

(22) Filed: Oct. 26, 2000

(51) Int. Cl.[7] .............................................. H04Q 7/24
(52) U.S. Cl. ...................................................... 370/338
(58) Field of Search .............................. 370/236, 282, 370/294, 310, 328, 329, 338, 362, 365, 421, 423, 489

(56) References Cited

U.S. PATENT DOCUMENTS

| | | |
|---|---|---|
| 5,651,008 A | 7/1997 | Geywitz et al. |
| 5,768,268 A * | 6/1998 | Kline et al. ................. 370/330 |
| 5,799,252 A | 8/1998 | Nakagoshi et al. |
| 5,894,474 A * | 4/1999 | Maison et al. .............. 370/347 |
| 6,009,329 A | 12/1999 | Hacena et al. |
| 6,011,785 A * | 1/2000 | Carney et al. .............. 370/330 |

FOREIGN PATENT DOCUMENTS

| | | |
|---|---|---|
| DE | 4423582 A1 | 1/1994 |
| EP | 0830041 A2 | 8/1997 |

* cited by examiner

Primary Examiner—Hassan Kizou
Assistant Examiner—Ahmed Elallam
(74) Attorney, Agent, or Firm—Coats & Bennett, PLLC

(57) ABSTRACT

The interconnection topology of a serial data communications bus allows for efficient communications within a wireless communications network. A wide-area wireless mobile communications system comprises a MSC connected to a plurality of base stations via a serial communications bus and a first serial port having a first connection order. Each base station also connects to the serial communications bus via a second serial port having an opposite connection order. In one mode, the MSC communicates with each base station over the serial bus through the first serial port. In a second mode, each base station can communicate directly with any other base station over the serial bus, with one base station utilizing the first serial port, and the other base station utilizing the second serial port. The invention is also applicable to a limited-area wireless communications system.

8 Claims, 4 Drawing Sheets

METHOD TO ENABLE TO PEER DEVICE COMMUNICATION OVER BI-DIRECTIONAL SERIAL BUS

BACKGROUND OF THE INVENTION

The wireless telecommunications industry has experienced phenomenal growth in recent years, particularly in the area of cellular telephone communications. This growth has led to a saturation of existing base station capacity in some areas. The growth in usage has also resulted in a shift in typical calling patterns of mobile telephone users. Initially, cellular telephones were primarily used to maintain communications by individuals whose jobs required mobility and those who were on-call during times that they were away from an office. Thus, the primary usage pattern was establishing a connection between a mobile cellular telephone and a fixed office within the Public Switched Telephone Network (PSTN). As cellular telephones have became ubiquitous, and particularly as ever-increasing sophistication has evolved the cellular telephone from a purely communications device to a multi-function mobile terminal, many people have adopted the mobile terminal as their primary vehicle for telecommunications. These people are as likely to use their mobile terminal to dial another mobile terminal as to dial a telephone within the PSTN. Hence, mobile-to-mobile communications comprise a large and increasing fraction of the cellular telephony bandwidth, bypassing the PSTN altogether.

To accommodate the burgeoning volume and emerging patterns of mobile-to-mobile wireless communications, a need exists for communications techniques that make maximum, efficient use of existing equipment bandwidth, within the confines of the existing infrastructure.

BRIEF SUMMARY OF THE INVENTION

In one embodiment, the present invention comprises a wide area wireless mobile communications system with inter-base station communications capability. A Mobile Switching Center (MSC) having a serial port interface is operatively connected to a Public Switched Telephone Network (PSTN). A serial communications bus, such as a T1 or E1 line, connects the MSC to a plurality of base stations via a first serial port having a first interconnection order at each base station. Each base station also connects to the serial communications bus via a second serial port having a second, opposite interconnection order. In a first communications mode, the MSC communicates with each base station over the serial communications bus through the base station's first serial port. In a second communications mode, each base station can communicate with any other base station over the serial communications bus, without intervention of the MSC, with one base station utilizing the first serial port, and the other base station utilizing the second serial port.

In another embodiment, the present invention comprises a limited-area wireless mobile communications system with inter-radio head communications capability. A serial communications bus, such as a T1 or E1 line, connects a Control Radio Interface (CRI) to a plurality of radio heads via a first serial port having a first interconnection order at each radio head. In a first communications mode, the CRI communicates with each radio head across the serial communications bus through the first serial port of each radio head. Each radio head also connects to the serial communications bus via a second serial port having a second interconnection order, opposite that of the first serial port. In a second communications mode, each radio head can communicate with any other radio head over the serial communications bus, without intervention of the CRI, with one radio head utilizing the first serial port, and the other radio head utilizing the second serial port.

DETAILED DESCRIPTION OF THE INVENTION

The present invention relates to an improved wiring topology for wireless communications systems. The wireless communications system may be a wide-area system, including multiple antenna towers that each provide coverage over a large geographic area, or cell. Alternatively, the wireless communications system may be a limited-area system, providing coverage within one or more office buildings, a campus, a sports arena, a shopping mall, or the like. A schematic depicting the basic features of both systems is shown in FIG. 1.

In both cases, the wireless communications system is designed and adapted to provide telephonic communications between mobile terminals (including cellular telephones) and telephones at fixed locations across the Public Switched Telephone Network (PSTN). As the number of mobile terminals in use increases, it is increasingly common for one mobile terminal to wish to establish communications with another mobile terminal, often within the same wireless communications system. This may be accomplished in the present invention by providing the operative units of the wireless communications systems (i.e., base stations or radio heads) with the ability to communicate directly with each other, and reducing the need to establish communications with the Mobile Switching Center (MSC) or Control Radio Interface (CRI) that interfaces the wireless communications system to the PSTN.

Figure 1:
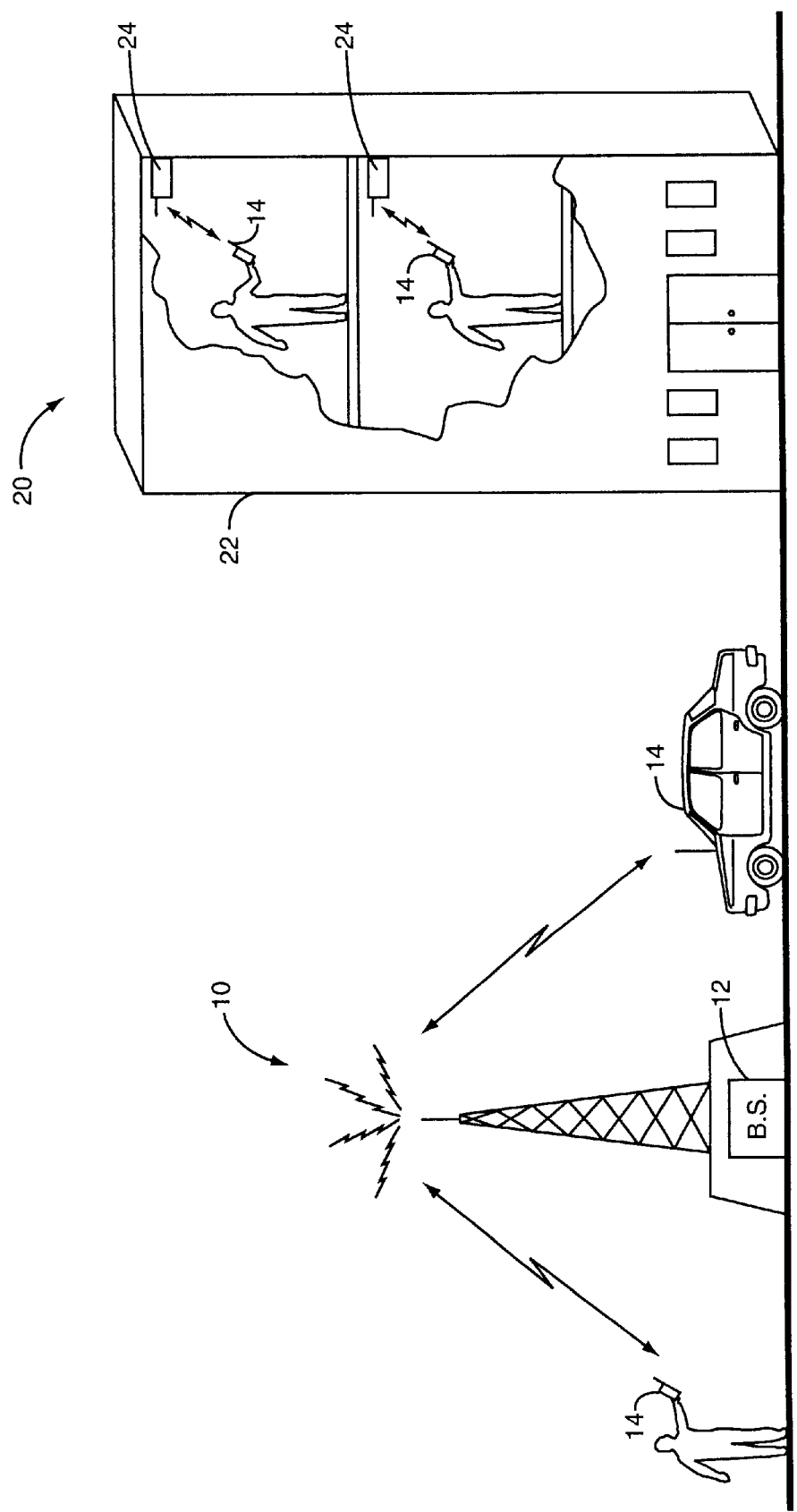
FIG. 1 is a schematic diagram depicting wide-area and limited-area wireless communications systems.

Referring to FIG. 1, a wide-area wireless communications system is indicated generally at 10. Wide-area wireless communications system 10 includes at least one base station 12 that contains the electronics, transceivers, and antennas (usually mounted on a tower) necessary to establish and maintain RF communications with mobile terminals 14 within its range, or cell. A typical wide-area wireless communications system 10 may contain many base stations 12, connected together via communications links, to provide communications coverage over a wide geographic area. A user of a mobile terminal 14 will typically establish communications through the base station 12 for which it receives the strongest control channel signal. As the user moves out of one cell and into another, the mobile terminal 14 will receive a stronger control channel signal from the base station 12 of the new cell, and will automatically lock on to the new base station 12. In this manner, wide-area wireless communications system 10 may cover a large geographic area, with the details of the location of base stations 12 transparent to the user. Such a wide-area wireless communications system may operate according to Telecommunications Industry Association (TIA) standard numbers IS-54 or IS-95 protocols, the disclosure of which is incorporated herein in their entirety.

Limited-area wireless communications system 20 is depicted in FIG. 1 as deployed within a building 22. In general, building 22 could also be any geographic locus, such as a shopping mall, sports arena, office building, hotel, apartment complex, airport, campus, or the like, within which a limited-area wireless system is deployed and operated. Limited-area wireless communications system 20 may be a Private Wireless Office System (PWOS), or may be accessible to the public. To implement the limited-area wireless communications system 20, radio heads 24 are strategically placed throughout the building 22 so as to provide radiocommunication service to mobile terminals 14 therein. Limited-area wireless communications system 20 operates much like the wide-area wireless communications system 10, with users seamlessly moving in and out of the range of individual radio heads 24. Limited-area wireless communications system 20, however, typically utilizes much lower powered antennas than the base stations 12 of wide-area wireless communications system 10, so as to limit its coverage to within a specific geographical area, such as a building 22. Limited-area wireless communications system 20 may be interfaced to the PSTN to provide the full scope of telecommunications to users of mobile terminals 14. Alternatively, limited-area wireless communications system 20 may be self-contained, wherein mobile terminals 14 within the building 22 may establish communications links only with other mobile terminals 14 within the system 20.

Figure 2:
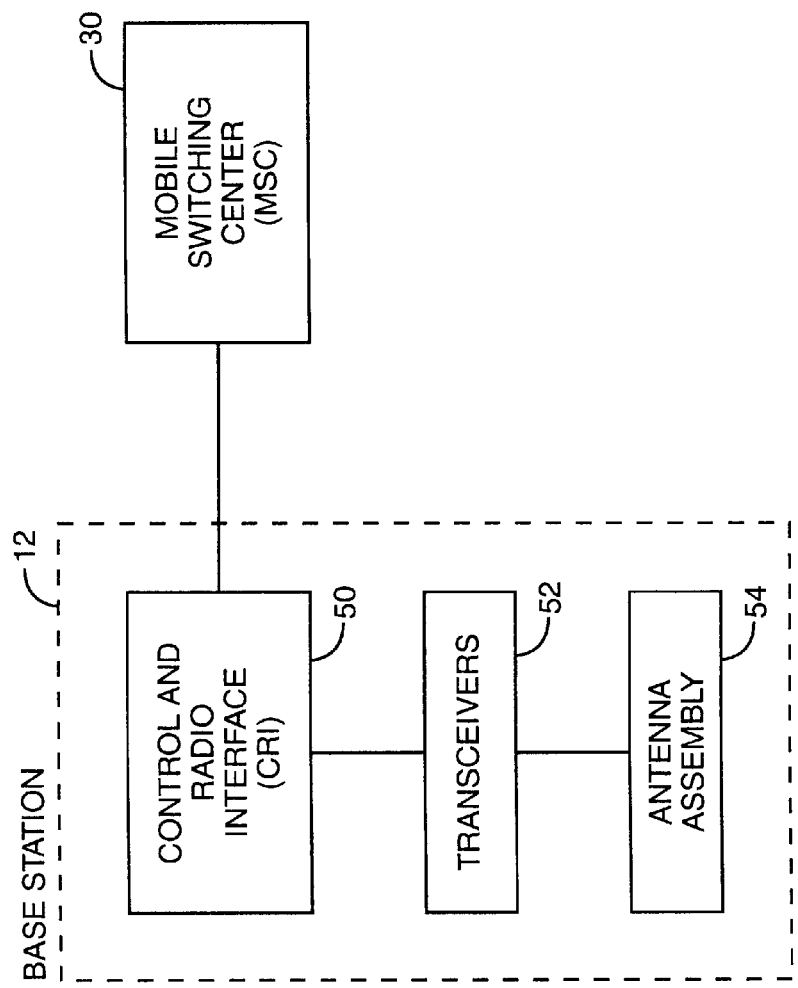
FIG. 2 is a block diagram of a wide-area wireless communications system base station.

FIG. 2 is a functional block diagram of a base station 12, as deployed in wide-area wireless communications system 10. Each base station 12 is operative to establish wireless communications with many mobile terminals 14 within its cell. Each base station 12 includes a Control and Radio Interface (CRI) 50, radio transceivers 52, and antenna assembly 54. CRI 50 is the control portion of base station 12. CRI 50 routes speech and control information between the MSC 30 and radio transceivers 52.

Radio transceivers 52 convert the channel and control information from CRI 50 into the Radio Frequency (RF) data received by the mobile terminals 14. Radio transceivers 52 also receive the RF transmissions from the mobile terminals 14 and convert them back to channel and control information that may be sent through the CRI 50 to the MSC 30 or to another base station. Channel information may include digitized voice communications, paging messages, data links between modems, or the like. Control information is also transferred between the mobile terminal 14 and base station 12, and may include e.g., power control, signal strength, identification codes, frequencies and status of neighboring base stations, and the like. Both channel and control information are referred to herein as "data."

Antenna assembly 54 includes combiners that connect the radio transceivers 52 to transmit antennas for transmission to mobile terminals 14. Antenna assembly 54 also includes multicouplers that connect the radio transceivers 52 to receive antennas for receipt of transmissions by mobile terminals 14.

Figure 3:
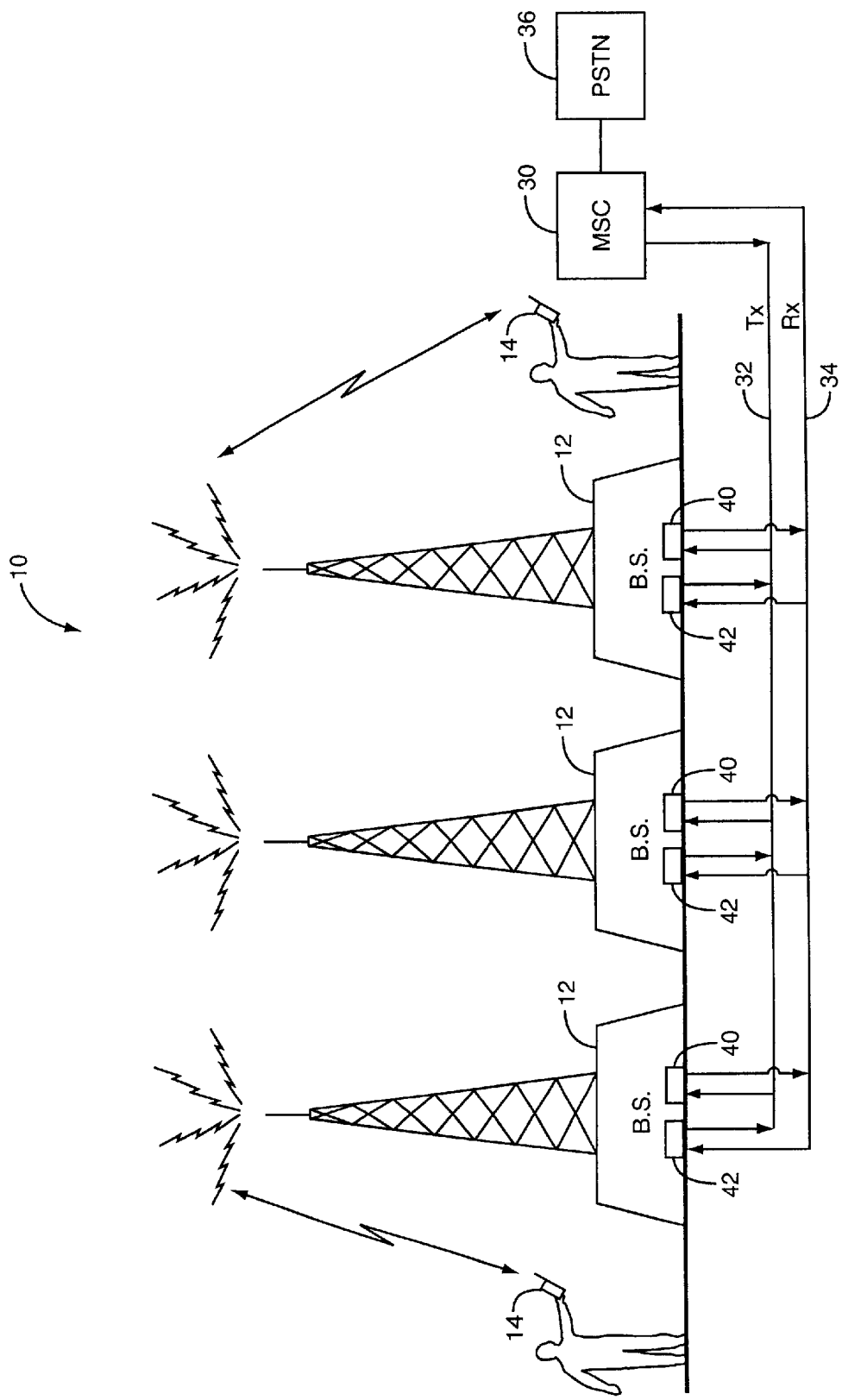
FIG. 3 depicts the wiring topology of base stations in a wide-area wireless communications system.

FIG. 3 depicts wide-area wireless communications system 10 in greater detail. A plurality of base stations 12 are connected to a MSC 30 that controls the base stations 12 and provides an interface to the PSTN 36. This connection is by a serial communications bus, including a transmit line 32 and a receive line 34. The nomenclature of the serial lines derives from the point of view of MSC 30 that directs data and control information to and from the base stations 12, i.e., it transmits data to a base station 12 and receives data from a base station 12.

Interfaced between the base stations 12 and the serial communications bus are a first serial port 40 and a second serial port 42. As used herein, the term "serial port" refers to an interface operative to transfer data to and from the serial communications bus, including the transceivers, control logic, software, and communication protocols necessary to effect such communication, as are well known to one of ordinary skill in the art. Both the first serial port 40 and the second serial port 42 are operatively connected to the transmit line 32 and receive line 34 of the serial communications bus. However, their interconnection order is opposite. That is, the first serial port 40 is connected so as to input data from the transmit line 32 into the base station 12, and to output data from the base station 12 to the receive line 34 of the serial communications bus. Conversely, the second serial port 42 is connected so as to input data from the receive line 34 into the base station 12, and to output data from the base station 12 to the transmit line 32. Thus configured, the first serial port 40 is operative when the base station 12 communicates as a "slave" device, and the second serial port 42 is operative when base station 12 communicates as a "master" device on the serial communications bus.

Two modes of communication involving a given base station 12 are defined. When establishing a communications link between a base station 12 and the PSTN 36, MSC 30 operates on the serial communications bus as a "master" device. That is, MSC 30 outputs data on the transmit line 32, that is received by one or more base stations 12 at the first serial port 40. In response, data is output by base station 12 through the first serial port 40 onto the receive line 34, and transmitted to the MSC 30. Note that in this mode of communication, it is not possible for one base station 12 to communicate directly to another base station 12, with both base stations 12 using their respective first serial ports 40. In other words, all base stations 12 within the system are "slave" devices in this communication mode. Any communication from one base station 12 to another must be received from the fist base station 12 by the MSC 30, and subsequently transmitted by the MSC 30 to the second base station 12. As used herein, "direct" communications, i.e., between two base stations 12, means communication that is not routed through a controller, i.e., the MSC 30.

The present invention provides for another mode of communication between base stations 12. Through the provision of the second serial port 42, connected to the serial communications bus in opposite order of the first serial port 40, two or more base stations 12 many communicate directly, without routing the entire data transfer through the MSC 30. For example, a first base station 12 may effect communication to another base station 12 by directing data through the second serial port 42, onto the transmit line 32. This data is received by a second base station 12 and transferred from the transmit line 32 through the second base station's first serial port 40. In response, the second base station 12 outputs data through the first serial port 40 onto the receive line 34. The first base station 12 then inputs this data from the receive line 34 through the second serial port 42. In effect, the second serial port 42 allows the first base station 12 to function as a "master" device on the serial communications bus. The second base station 12 in this example functions as a "slave" device on the serial communications bus, through the first serial port 40. The operation of the second base station 12 is the same as during the first mode of communication (when communicating through the MSC 30 to the PSTN 36).

As more and more people migrate to mobile terminals 14 as their primary means of telephonic communication, the chances increase that a given telephone number a person may wish to call will likewise be a mobile terminal 14. Thus, the amount of intra-wireless system traffic will increase. Since in this scenario, there is no communication through the PSTN 36, there is no need for the MSC 30 to perform the entire communication by acting as a "master" device and route this data between two "slave" base stations 12, as is required in the first mode of communication discussed above. The MSC 30 may merely "set up" the call, initialize the two base stations 12, and then allow the two base stations to communicate using the second mode—allowing one base station 12 to act as a "master" device and the other base station 12 to act as a "slave." The MSC 30 sends the appropriate message to the two base stations when it detects that routing through the PSTN is not necessary. The base stations then communicate with each other, utilizing device addresses to recognize and act on the serial bus traffic. The MSC may relinquish exclusive control of the serial bus to the base station 12 acting as a master device, for limited time periods. This second communication mode reduces the load on MSC 30 and makes more efficient use of the serial communications bus.

Figure 4:
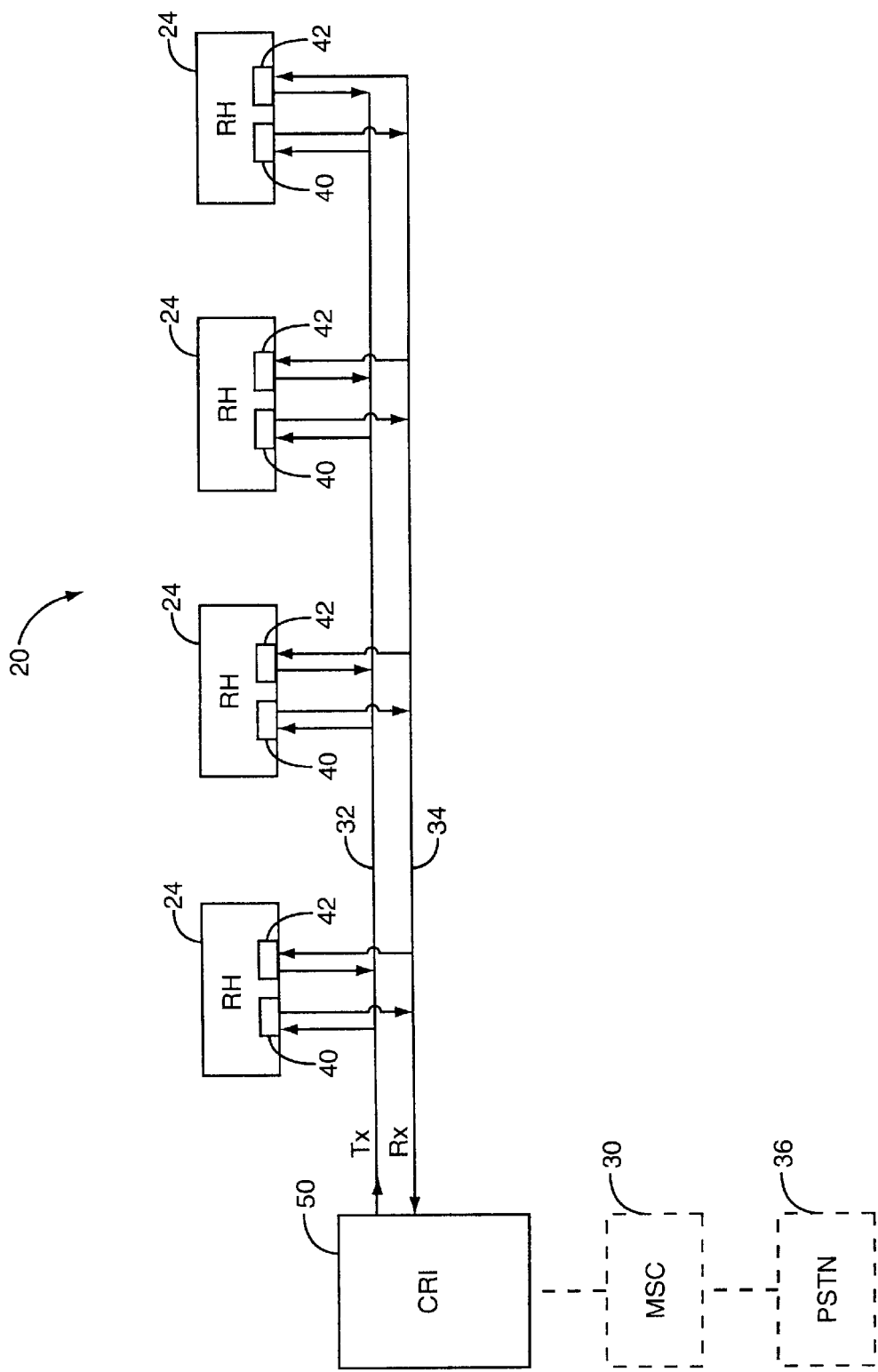
FIG. 4 is a block diagram depicting the wiring topology of radio heads in a limited-area wireless communications system according to the present invention.

An analogous situation exists in limited-area mobile communications systems, where system response may be improved and simplified by allowing direct communications between radio heads. FIG. 4 depicts a block diagram of a limited-area mobile communications system 20. A plurality of radio heads 24 is connected to CRI 50 by a serial communications bus having a transmit and a receive line. CRI 50 and the serial communications bus are functionally equivalent to the corresponding elements in a wide-area mobile communications system 10, as described above.

Radio heads 24 function similarly to the base stations 12 of a wide-area mobile communications system 10, in that they establish and facilitate radio communications with mobile terminals 14 within their range. Radio heads 24 combine the functions of the transceivers 52 and antenna assembly 54 of a base station 12, as described above.

Within a limited-area mobile communications system 20, the CRI 50, the serial communications bus, and the radio heads 24 are sufficient to establish communications between mobile terminals 14 within the limited-area system 20. Additionally, CRI 50 may be connected to a MSC 30. This would allow for connection through MSC 30 to another limited-area mobile communications system 20, to provide, for example, a campus-wide wireless communications system linking two or more buildings. Alternatively, or additionally, MSC 30 may be connected to a PSTN 36, to allow telecommunications with fixed telephones or mobile terminals 14 outside of the limited-area mobile communication system 20. However, in many cases this connectivity to the PSTN 36 is neither necessary nor desired. Limited-area mobile communications system 20 is sufficient without the inclusion of MSC 30 and PSTN 36 to effect wireless communications between mobile terminals 14 located within range of its radio heads 24.

When connected to an MSC 30 (with or without additionally being connected to a PSTN 36), the limited-area mobile communications system 20 operates in a first mode directly analogous to the first mode described above for the wide-area mobile communication system 10, with the exception that CRI 50 (as opposed to MSC 30) is the "master" device on the serial communications bus.

Also analogous to the wide-area mobile communications system 10, the provision of the second serial port 42 allows communication between two or more radio heads 24 across the serial communications bus in a second mode, without routing the data through the CRI 50. A first radio head 24 effects communication by becoming a "master" device on the serial communications bus through utilization of the second serial port 42, and places data on the transmit line 32. The data is received at a second radio head 24, acting as a "slave" device, through the first serial port 40. In response, the second radio head 24 outputs data through the first serial port 40, onto the receive line 34. The first radio head 24 then inputs the data from the receive line 34, through the second serial port 42. As in the case of MSC 30 in the wide-area mobile communications system 10, the CRI 50 sets up the communications through messages to each of the radio heads 24, and temporarily relinquishes control of the serial bus to the first radio head 24 acting as a bus master.

The same benefits accrue through use of the second communications mode as described for the wide-area mobile communications system 10, i.e., less data traffic through the CRI 50 and more efficient use of the serial communications bus. This second mode is particularly important in the limited-area mobile communications system 20 where no connection is established to the PSTN 36. In this situation, all communications within the limited-area mobile communications system 20 are between mobile terminals 14 within the limited-area system 20. This may occur, for example, in an amusement park, shopping mall, or similar facility where patrons may rent mobile terminals 14 to keep in touch with other members of their party, but the mobile terminals 14 may not connect to the PSTN 36 and hence incur usage fees. As another example, in an office environment, the capability may exist for mobile terminals 14 to place calls through the PSTN 36, but because of the nature of intra-office communications, the bulk of usage within the limited-area wireless communications system 20 is inter-radio head.

Although the present invention has been described with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention.

What is claimed is:

1. A wireless telecommunications system, comprising:
    a central unit;
    a plurality of transceiver stations connected to said central unit and to each other via a serial communications bus, said serial communications bus comprising at least a first line and a second line;
    each of said plurality of transceiver stations comprising at least a first serial port operative to receive data on said first line and send data on said second line;
    each of said plurality of transceiver stations further comprising at least a second serial port operative to send data on said first line and receive data on said second line;
    wherein said plurality of transceiver stations receive data from said central unit via said plurality of transceiver stations' respective first serial ports; and
    wherein a first one of said transceiver stations may send data directly to a second one of said transceiver stations via the first transceiver station's second serial port.

2. The system of claim 1, wherein said serial communications bus comprises a T1 line.

3. The system of claim 1, wherein said serial communications bus comprises an E1 line.

4. The system of claim 1, wherein said central unit is a mobile switching center and said transceiver stations are base stations.

5. The system of claim 1, wherein said central unit is a control radio interface and said transceiver stations are radio heads.

6. A method of transmitting data between a central unit and a plurality of transceiver stations and between two or more of the transceiver stations, wherein the data is transmitted via a serial communications bus connecting the central unit to the transceiver stations by first and second serial ports at each transceiver station, comprising:

transferring data between said central unit and each said transceiver station by directing the data along said serial communications bus and through said first serial port associated with each said transceiver station; and transferring data between two of said transceiver stations, independently of said central unit, by:

transferring data from a first transceiver station via said second serial port to said serial communications bus; and transferring the data from said serial communications bus to a second transceiver station via said first serial port;

wherein said serial communications bus comprises a transmit and receive line, and each said transceiver station:

inputs data from said transmit line and outputs data on said receive line via said respective first serial port, and inputs data from said receive line and outputs data on said transmit line via said respective second serial port.

7. The method of claim 6, wherein said central unit is a mobile switching center and said transceiver stations are base stations.

8. The method of claim 6, wherein said central unit is a control radio interface and said transceiver stations are radio heads.

\* \* \* \* \*

UNITED STATES PATENT AND TRADEMARK OFFICE
CERTIFICATE OF CORRECTION

PATENT NO. : 6,754,198 B1
DATED : June 22, 2004
INVENTOR(S) : Ossi Llari Grohn

It is certified that error appears in the above-identified patent and that said Letters Patent is hereby corrected as shown below:

<u>Title page, Item [54], and Column 1, line 1,</u>
Title page, the word "PEER" should be inserted between "ENABLE" and "TO" making the title "METHOD TO ENABLE PEER TO PEER DEVICE COMMUNICATION OVER BI-DIRECTIONAL SERIAL BUS."

Signed and Sealed this

Tenth Day of August, 2004

JON W. DUDAS
*Acting Director of the United States Patent and Trademark Office*